United States Patent [19]

Martin

[11] 4,296,601
[45] Oct. 27, 1981

[54] ELECTRONIC FUEL CONTROL SYSTEM

[75] Inventor: Anthony N. Martin, Simsbury, Conn.

[73] Assignee: Otis Elevator Company, Hartford, Conn.

[21] Appl. No.: 69,142

[22] Filed: Aug. 23, 1979

[51] Int. Cl.$^3$ ............................................. F02C 9/42
[52] U.S. Cl. ........................................ 60/224; 60/243
[58] Field of Search .................. 60/243, 224, 39.28 R

[56] References Cited

U.S. PATENT DOCUMENTS

| | | | |
|---|---|---|---|
| 2,882,672 | 5/1975 | Bauerfeind | 60/39.28 R |
| 3,797,233 | 3/1974 | Webb et al. | 60/39.28 R |
| 3,956,884 | 5/1976 | Eves | 60/39.28 R |
| 3,971,208 | 7/1976 | Schwent | 60/39.28 R |
| 4,104,876 | 8/1978 | Larsen et al. | 60/39.28 R |
| 4,171,613 | 10/1979 | Roedenbeck et al. | 60/34.28 R |
| 4,173,119 | 11/1979 | Greune et al. | 60/39.28 R |

*Primary Examiner*—Robert E. Garrett
*Attorney, Agent, or Firm*—Robert E. Greenstien

[57] ABSTRACT

Fuel flow to a gas turbine engine is controlled in response to power lever position and CDP by a hydromechanical section. The hydromechanical section includes a torque motor which may be activated to modify the fuel flow to the engine in response to a control signal produced by an electronic control section. The electronic control section senses a number of engine and ambient parameters and generates engine operating limits from these parameters. The limit corresponding to the lowest maximum engine speed is selected and referenced to actual engine speed for generating the control signal, thereby providing a closed loop engine speed control. At least one of the computed limits is an actual maximum engine speed for steady state engine operation and is used to recompute the engine scheduled speed so that the actual maximum engine speed is obtained at the maximum power lever advance position; in this way power lever dead band is eliminated. The electronic control also modifies fuel flow to the engine for speed synchronization with another identically controlled engine.

7 Claims, 9 Drawing Figures

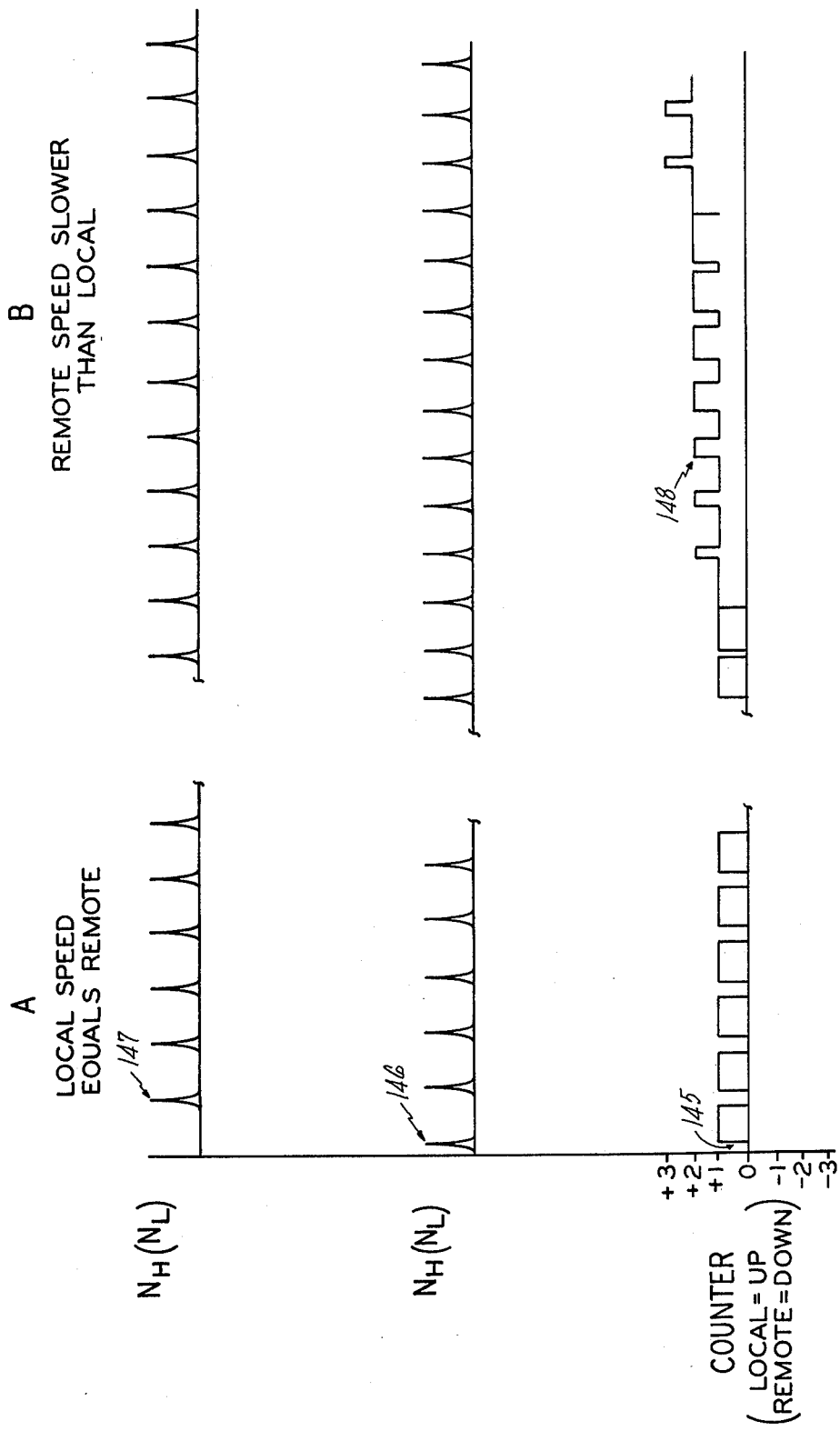

ELECTRONIC FUEL CONTROL SYSTEM

CROSS-REFERENCE TO RELATED APPLICATIONS

This application relates to these copending U.S. patent applications, also assigned to the Assignee hereof: Ser. No. 069,140, NEGATIVE RATE COMPENSATED HYDRAULIC SERVO SYSTEM, filed Aug. 23, 1979; Ser. No. 069,139, HYDROMECHANICAL FUEL CONTROL WITH INDEPENDENT ELECTROMECHANICAL INTERFACE, filed Aug. 23, 1979; and Ser. No. 069,141, GOVERNORLESS GAS TURBINE FUEL CONTROL, filed Aug. 23, 1979.

BACKGROUND OF THE INVENTION

This invention relates to fuel controls, in particular, fuel controls for gas turbine engines.

The steady state operating characteristics of the typical gas turbine engine are such that as engine speed (N) increases the ratio between fuel flow ($W_f$) and compressor discharge pressure (CDP) must be increased. The ratio, $W_f/CDP$, is commonly referred to as ratio units. At low engine speeds, near idle, for example, another important characteristic of the gas turbine engine is that the differences between ratio units at different speeds are quite small. In other words, the steady state curve is substantially horizontal in the idle regions; in fact, it actually may have a reverse slope at low speeds.

The principal purpose for a gas turbine engine fuel control is to schedule fuel flow to the engine in a prescribed relationship to compressor discharge pressure in response to the power demands and changes made through a power lever. Generally speaking, the fuel control varies the ratio units in relation to engine power settings: During acceleration and high power demand conditions the ratio units are high; during low power operating conditions, such as deceleration, the ratio units are small. Thus, the fuel control may be viewed as scheduling the ratio units between prescribed minimum and maximum levels. For any particular power lever advance (PLA) the relationship between ratio units and engine speed ideally is constant. The intersection of the engine steady state line and the ratio unit line occurs at the engine's steady state speed for that PLA, which thus defines the particular ratio unit at that speed. At moderate and high engine speeds the intersection occurs a significant angle. Consequently, the differences between ratio units for different speeds is quite significant, and, as a result, minor variations in ratio units do not produce significant changes in engine speed. Thus, engine speed accuracy is quite high in these regions. However, at the lower engine speeds, where the steady state curve is flat or horizontal, the intersection angles are much smaller and the operating points therefore are not nearly as well defined. Thus, at lower speeds, the engine speed accuracy may be poor, making it difficult to obtain a desired speed at a particular PCA position.

The prior art focuses on numerous ways to alleviate these accuracy problems. In general, solutions have focused on scheduling minimum ratio units at the lower engine speeds through the use of a mechanical governor in the fuel control; by scheduling a minimum fuel flow for different low power (idle) settings, the intersection angles are increased dramatically. Above idle speeds, governor operation is not necessarily utilized, however, and the ratio units may be programmed in response to CDP alone. One example of a governor system is shown and described in my U.S. Pat. No. 3,611,719 for a FUEL CONTROL, which issued on Oct. 12, 1971 and is commonly owned herewith.

An additional constraint imposed upon gas turbine fuel controls is the need for an absolute minimum fuel flow to the engine for any PLA beyond a shutdown position. Typically, this has been achieved by providing supplemental fuel flow control circuits which act in conjunction with the minimum fuel flow provided by the mechanical governor, that simply establishes different minimum fuel flow in the idle region for different low power PLA settings.

Another function of a gas turbine fuel control is to modify fuel flow to the engine in relation to various parameters, such as engine speed, acceleration, and temperature, and ambient temperature and pressure. The reason for this is two-fold: to increase engine operating efficiency and to prevent engine operation at certain speeds and ratio units so as to avoid operation in the engine surge region. Recent advances in fuel controls are marked by increased use of electronic interfaces with hydromechanical fuel controls to provide these fuel flow modification characteristics. Principal among these recent advances is the use of computer based systems which sense the various parameters to provide signals which modify fuel control in the hydromechanical portion of the system. In as much as reliability is a principal factor in all fuel controls, it continues to be considered important to provide for engine operation separate and apart from the electronic portion. In other words, the electronic portion should not be used as the sole means for controlling the fuel control but, instead, as a means for modifying a basic control provided by the hydromechanical portion.

The foregoing techniques for achieving stable, efficient engine operation and establishing minimum fuel flow add considerably to the cost, maintenance and size of the fuel control system. Thus, while performance of such controls has been excellent, there is a distinct need for smaller, lighter fuel controls that accomplish the same results at significantly less cost. This is especially true for fuel controls for small turbine engines, such as those used on small, private jets and the like.

Frequently, another function, performed by the fuel control, especially more recent types, is preventing engine overboost operation. Generally this is done by limiting the fuel flow to the engine to a maximum level which is adjusted down in a prescribed relationship to a number of engine operating parameters, such as engine temperature, speed, compressor bleed. Contemporary approaches, however, are characteristically similar in that they limit fuel flow independently of actual power lever position. The most immediate consequence of this is a dead band region in the available power lever advance range. To the operator of the engine, this appears as a range of available power lever movement for more power, but no further engine power is actually available. Essentially, the dead band then is nothing more than a flat spot in the PLA-N curve. It can make engine control difficult because the operator may attempt to apply more power by advancing the lever from an intermediate position, yet no more power is available because the engine may actually be at its maximum power.

In dual engine installations the fuel controls supply fuel to their respective engines as a function of its engine's operating parameters. Contemporary engine control systems provide for engine synchronization by the controlling mechanical connection between the power lever and the fuel control. The speed of one engine is sensed as a reference speed and the power lever of the other engine is moved so as to adjust its speed to that of the reference. The accuracy and reliability of such systems is indirectly limited by such factors as mechanical hysteresis and control linkage dead band.

SUMMARY OF THE INVENTION

Objects of the present invention include providing engine down control with overboost protection but without a dead band range during power lever operation.

Another object is providing engine speed synchronization in multiple engine installations without mechanical interconnection with the power lever system.

In accordance with the present invention the maximum permissible engine speed during any operating condition is computed and correlated with percentage power lever position so as to control fuel flow to the engine so that the maximum permissible speed is achieved at the maximum power lever position; thus power lever dead band is avoided. A hydromechanical fuel control provides basic ratio units to the engine as a function of power lever position. The ratio units are adjusted by a closed loop control of engine power set points and limits on both acceleration rate and deceleration rate. Power lever position is employed to modify the basic ratio units so as to restrict engine operation between a maximum deceleration rate and a maximum acceleration rate. Within these limits fuel control is likewise modified as a function of PLA position with respect to a maximum engine speed, rather than acceleration and deceleration rates.

These functions are accomplished by establishing an inner speed governing loop whose reference is the most significant one of three power setting parameters: a maximum acceleration parameter, a maximum deceleration parameter and a maximum engine speed parameter.

One aspect of the invention focuses upon generating the maximum permissible engine speed for the instantaneous engine operating conditions. An error signal indicative of the difference between desired speed and PLA baseline scheduled speed is generated and is then scaled in proportion to the percent power actually requested through the power lever. This produces a correction signal which is then summed with the baseline error signal to produce a smaller speed reference signal which is supplied to the speed loop reference. The smaller signal is compared with actual engine speed and causes smaller fuel flow for the particular operating condition. The effect of this is to completely shift the PLA engine speed curve downward so that the maximum permissible engine speed always occurs at the maximum PLA position. This avoids the dead band of prior art controls.

Another aspect of the invention is that the correction signal may be additionally modified with respect to the differences between the speed of two engines. Hence, in a dual engine installation the fuel control of one engine may be used to increase flow thereto so as to cause it to speed up slightly and the fuel control in the other engine may be used to reduce flow thereto so as to cause it to slow down. Both engines thereby meet at a common speed.

A feature of the invention is that analog means is utilized to generate the baseline speed error signal and to control fuel flow. Computation of the acceleration, deceleration and maximum speed limits, and the error correction signal are accomplished through a low level digital system which is made possible because: the limit ranges are small; the baseline speed error signal, which is utilized together with the error correction speed error signal, is simply proportioned down as a function of the engine operating parameters and power lever position; and all limits and speeds are computed as "rate of change" limits which are analog integrated and referenced to actual engine speed in an analog control loop. As a result, the digital computation does not involve high order engine speeds, but rather lower order rate of change parameters. Through analog integration high resolution—low granularity—in engine control is nevertheless attained. Use of lower level digital computations permits the use of less expensive processing equipment.

The foregoing and other features, benefits and objects of the present invention will be apparent to one skilled in the art from the following detailed description and claims that follow and the drawing, wherein:

DESCRIPTION OF THE DRAWING

FIG. 8 is a graph containing several waveforms on a common time base at two different time intervals.

DETAILED DESCRIPTION

Figure 1:
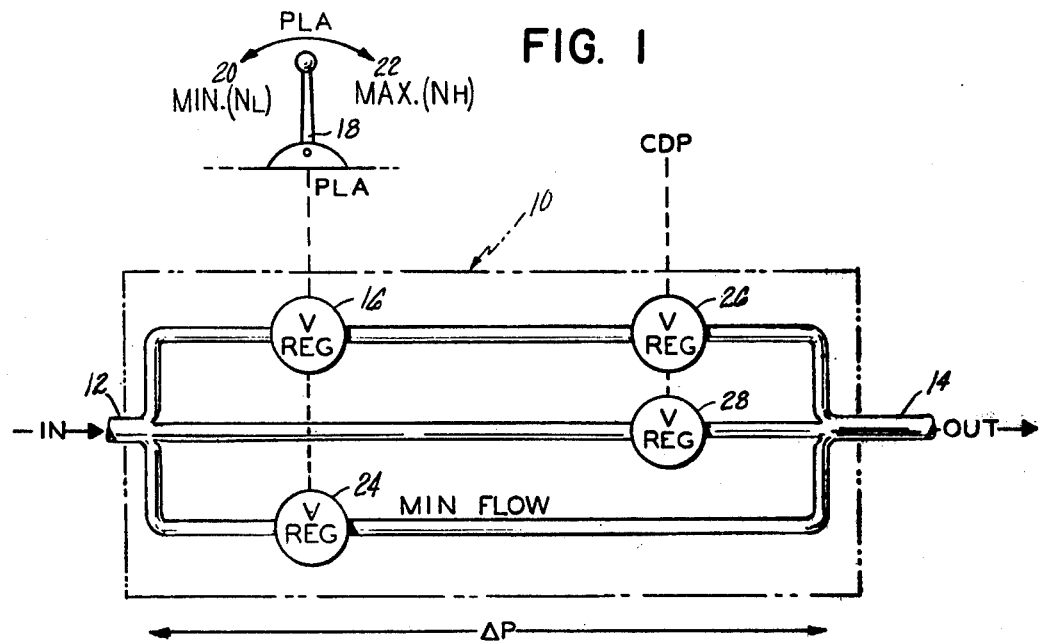
FIG. 1 is a functional block diagram of a governorless fuel control valve system.
Figure 2:
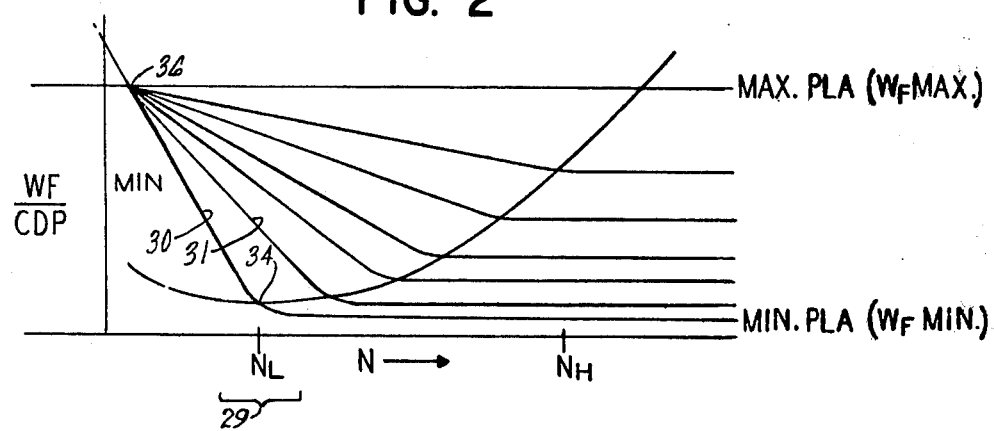
FIG. 2 is a graph showing the relationship between ratio units and engine speed produced by the fuel control of FIG. 1.

FIG. 1 shows a three circuit valve system 10 which regulates fuel flow to an engine (not shown) in response to engine CDP and requested power. FIG. 2 shows the relationship established by this system 10 between ratio units ($W_f$/(CDP) and engine speed (N) at different power lever advance PLA positions.

Fuel is pumped to a common fuel input port 12 and exits from a common fuel output port 14 en route to the engine. A first variable window valve 16 is mechanically coupled to the engine power lever 18 which is advanceable between a fully closed position 20 and a fully opened position 22 for selecting engine speed in the range from idle ($N_L$) to fuel power ($N_H$). A second variable window valve 24 is also connected to the power lever 18. The fuel which flows through the valve 16 goes to another variable window valve 26 which is responsive to CDP in a way that as CDP increases, its window opening increases. Another variable window valve 28 is also responsive to CDP in the same manner, but it receives fuel directly from the input port 12. Consequently, the fuel that is supplied to the engine, at the port 14, is the sum of the fuel that exits the valves 20, 22 and 24.

Fuel pressure between the input and the output of the valve arrangement is held at a constant pressure by means of a pressure regulator, which is not shown in FIG. 1, in as much as its design and operation is well known. However, in FIG. 3 a typical pressure regulator is shown in a hydromechanical fuel system which embodies the system 10 and is described in a latter portion of this description.

The valves 16 and 24 are so arranged in their interconnection to the power lever 18 that when the lever is at the minimum power position 20, the window of valve 16 is completely closed and the window of the valve 24 is completely open. The valve 24 thus produces an absolute minimum fuel flow to the engine, regardless of CDP. In other words, even if CDP is hypothetically zero, a minimum fuel flow, from the valve 24, is provided to sustain engine operation. As the power lever is advanced (PLA is increased) towards position 22, the valve 24 closes progressively, thus reducing the minimum fuel flow. Simultaneously, however, the window of valve 16 opens, thus increasing the fuel flow to the valve 26, whose window opening is regulated in response to CDP. Since the valve 28 receives the fuel directly from the input port 12, the flow therethrough and to the engine is simply a function of CDP, and, generally, as CDP increases (N increases) the window opening increases in a predetermined relationship to provide more fuel flow. The relationship between CDP and fuel flow is derived principally from the window configuration design and, using well known techniques, the relationship may be tailored to achieve a particular fuel flow change in response to CDP throughout the CDP range, as shown, for example, by the curves in FIG. 2. This criteria also applies to the other CDP responsive valve 26.

Referring to both FIGS. 1 and 2, at the lower PLA positions the CDP flow characteristics of the valves 26, 28 are added to the minimum flow characteristics of the valve 24. However, at low speed (i.e. region 29) the flow from the CDP valves 26, 28 is small by comparison to the minimum flow, since CDP is low. In this region fuel flow ($W_f$) therefore is essentially a different constant for each PLA, which gives rise to the decreasing negative slope of the minimum flow portions (i.e. 30, 31) as PLA increases.

As engine speed (N) increases with increasing PLA, the fuel flow ($W_f$) increasingly becomes a function mainly of CDP and PLA. This produces the flattening shown in the curves in FIG. 2 as engine speed (N) increases, and it occurs mainly because as PLA increases, the minimum flow from the valve 24 is decreased; the flow to the CDP responsive valve 26 is increased (by the increased opening of the window of the valve 16) and the flow through valves 26 and 28 is increased, as CDP increases, with (N).

At lower PLA positions the intersections (i.e. 34) of the engine steady state line and the PLA curves occurs at a significant angle. The principal reason for this is that all the PLA curves originate from the same maximum ratio unit point 36 which is defined by the absolute minimum ($W_f$) for zero CDP. This is produced by minimum flow valve 24 which, as stated before, supplies an absolute minimum fuel flow to the engine at the minimum PLA position, regardless of engine speed and CDP.

Because the intersection angle is high (at both low and high speeds) the ratio units associated with each PLA position for a particular engine speed on the steady state line is exceedingly well defined. Thus, there is high resolution, meaning: each PLA position results in a specific engine speed. The establishment of the constant slope minimum fuel flow portion (i.e. 30, 31) for each PLA provides the high intersection angle in the low engine speed region 29, where it is critical for speed accuracy, because the steady state curve noticeably has zero and negative slopes there. As the intersection angle in this region of the steady state curves gets smaller, engine speed control accuracy suffers directly because the intersection points merge, which produces imprecise operating points for each PLA in the low speed ring. Hence, by establishing a high intersection angle, the fuel control provides high speed accuracy in the low speed range. At high speeds the steady state curve slope is high and the intersection with the PLA curves therefore does not present a problem to speed accuracy.

Figure 3:
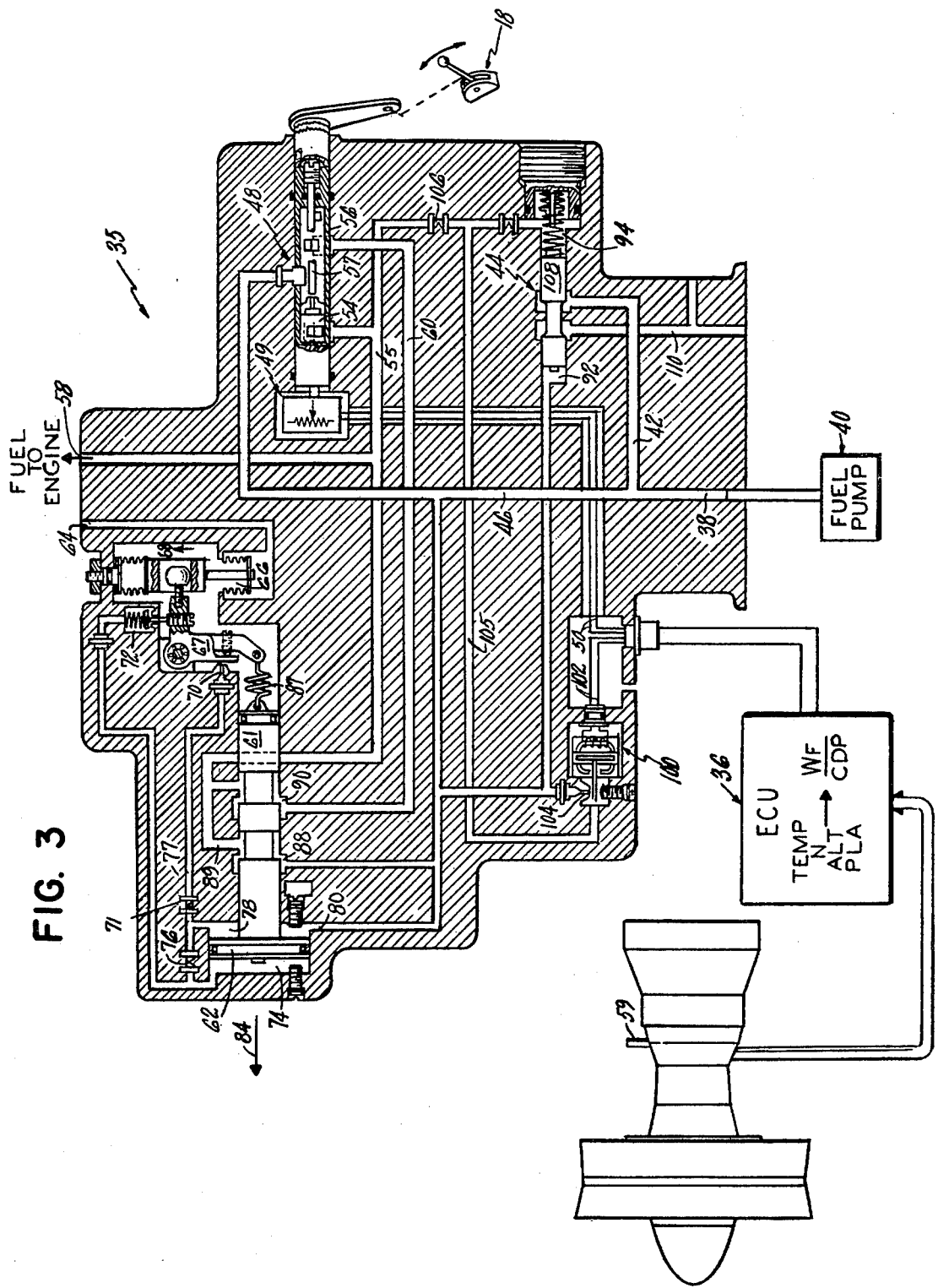
FIG. 3 is a cross-sectional view of a fuel control system embodying the present invention.

FIG. 3 shows a fuel control system 35 which incorporates the valve arrangement 10. This system includes an electronic computation unit (ECU) 36 which monitors various engine operating parameters and environmental parameters so as to control the operation of the fuel control to modify the fuel applied to the engine. A distinctive characteristic of this fuel control system is that without any significant impairment engine operation can continue in the absence of ECU control. The main reason for this is that hydromechanical portions establish the minimum flow to the engine necessary for acceleration and deceleration in response to the movement of the power lever. On the other hand, the ECU 36 modifies this "basic" flow in response to certain engine and environmental parameters. In this way, the reliability of a purely hydromechanical system is provided, together with the features of precise fuel control adjustment available from a continuously monitoring electronic fuel control system.

Fuel is supplied to an input port 38 from a fuel pump 40. The fuel flows through a line 42 to a regulating valve assembly 44 and then through another line 46 to a power lever valve 48, which is connected to the power lever 18. The valve 48 is connected to a potentiometer 49 which is used to supply an electronic signal to the ECU over lines 50; the signal indicates the power lever position. The power lever valve 48 has two variable opening windows 54, 56 and an engine shutdown window 57 which discontinues all fuel flow to the engine when the lever 18 is pulled back to a certain shutdown position. The window 54 provides a minimum flow window which provides minimum fuel flow through a line 56 to a fuel control outlet 58 which is connected to the engine fuel input 59. With the power lever in its minimum position, the window 54 is fully open and provides an absolute minimum fuel flow to the engine. The other window 56 is an acceleration window that opens as the power lever is advanced, which simultaneously closes the minimum flow window 54. The fuel from the window 56 flows into a line 60 to a dual window valve 61 connected to a servo 62. The servo 62 senses CDP on a port 64. As CDP increases, it pushes a bellows 66 upward 68, thereby rotating a bellcrank or arm 67 counterclockwise. As the bellcrank 67 is rotated counterclockwise, it progressively opens a positive rate flapper valve 70 and a negative flapper valve 72. As CDP decreases, the bellcrank 67 rotates clockwise and the valves 70, 72 progressively close. Together the valves 70, 72 provide negative rate compensation to the servo in a manner described in detail in the copending application thereon. The flapper valve 72 is connected to a low pressure side 74 of the servo. The low pressure side 74 is connected through an orifice 76 to the high pressure side 78 which connects with the valve 70 over a line 77. The high pressure side has an effective area which is less than the area on the low pressure side (i.e. one-half). The high pressure side 78 is connected over a line 80 to the fuel supply line 38. As CDP increases, for example, fuel flow through the orifice 76 increases as the valve 72 opens. This decreases the pressure on the low side of the servo which then moves to the left 84. A decrease in CDP, however, causes movement to the right by increasing the pressure on the low side as fuel flow through the valve 72 decreases. The servo moves the valve 61 which is coupled through a spring 87 to the bellcrank. The servo pulls the valve 61 in the direction 84 as CDP increases, which pulls the bellcrank in a direction causing the flapper valves 70, 72 to close and reducing the flow through the orifice 76 to a "null" level which holds the servo in position against the spring. A decrease in CDP results in an opposite reaction: the servo moves to open the valves to the null fuel point. Hence, as CDP changes, the servo moves the valve so as to return the valves 70, 72 to the null position. As the valve 61 moves, it varies the opening of a window 88 which is connected by a line 89 between the fluid supply line 38 and the fuel control output. Similarly, the movement of the valve 61 varies the opening of a second window 90 which receives fuel from the power lever window 56 over the line 60 and controls its flow to the output 54 over the line 89. Thus, the fuel output from the control increases with CDP, due to the increasing window area provided by the movement of the valve 61 to the left. Conversely, as CDP is reduced, the valve moves to the right and reduces fuel flow. At low CDP (i.e. startup) the windows 88, 90 are closed. Similarly, at startup, the window 56 is closed and fuel is supplied from the minimum fuel flow window 54. It should be obvious then that the operation of the servo and the valve 61 provide the functional operation of the valves 26, 28 in the simplified three circuit system shown in FIG. 1; the window 54 corresponds to the valve 28 and the window 56 corresponds to the valve 26. Similarly, the power lever valve provides the operation of the valves 16, 24 therein: the window 54 corresponding to the minimum flow valve 24 and the window 50 corresponding to the valve 16.

The pressure across the valves is held constant for the use of a regulating valve system 44. In this way, a constant $\Delta P$ (FIG. 1) is provided. The regulating valve system operates in a conventional manner by sensing fluid pressure on one side 92 and referencing it against a spring 94 which applies force to the other side of the valve. However, as described in the latter portion of this description, pressure across the valves may be modified to achieve dynamic changes in ratio units under control of the ECU.

Included in the fuel control is an electric torque motor 100 which receives electrical signals from the ECU over lines 102. In response to these signals the torque motor opens a flapper valve 104 which is normally closed in the absence of a signal. As mentioned in an earlier portion of this description, the ECU and torque motor provide an electrical interface to the hydromechanical fuel control to provide proper fuel ratio units to the engine in relation to power lever movement, engine speed, temperature, acceleration and the ambient characteristics, and thereby provide for safe engine operation in the absence of ECU control. In essence, the ECU may be programmed to close the loop on various engine parameters, such as engine speed and exhaust gas temperature and change ratio units, until the correct ratio units are achieved for the engine at any operating condition. The ECU accomplishes this by applying a correction signal to the torque motor to modify the fuel flow produced by the hydromechanical portion in order to achieve the precise ratio units. The ECU may consist of a hard wired circuit to modify fuel control or may be used with other known electronic monitoring systems. The modifications to ratio units in response to those parameters obviously depends on the specific characteristics of the gas turbine with which the fuel control is utilized. Thus it is obvious that a feature of this fuel control system is that through control of the torque motor, fuel flow requirements may be "modified" in numerous ways to tailor engine performance.

As the torque motor opens the flapper valve 104, there is fuel flow through a line 105 that goes to an orifice 106 which connects to the fuel control outlet 58. The increased flow caused by the opening of the flapper valve produces a pressure drop across the orifice 106, and this pressure drop increases the pressure drop across the windows 88, 90 in the valve 61 and the windows 54, 56 in the power lever valve 48 that are in circuit with the orifice 106 by reason of their parallel connections to the fuel outlet 58. The pressure regulating valve 44 maintains constant pressure upstream from the windows, at 42. It does this through movement of the valve 108 which moves to close the path between the line 42 and a bypass line 110 as the pressure across orifice 106 changes. This reduces bypass flow and causes more flow to the windows through line 46. In this fashion fuel flow through the fuel outlet is increased indirectly by operation of the torque motor. It is significant that there is substantial "gain" between the flow through the torque motor flapper valve and the actual increase in fuel flow at the fuel outlet that results from the change in pressure it brings about. As a result of this, a small, low powered torque motor may be used. In general, this means that it will have very small hysteresis qualities, thereby making it possible to obtain extremely precise modifications of the fuel flow.

Figure 4:
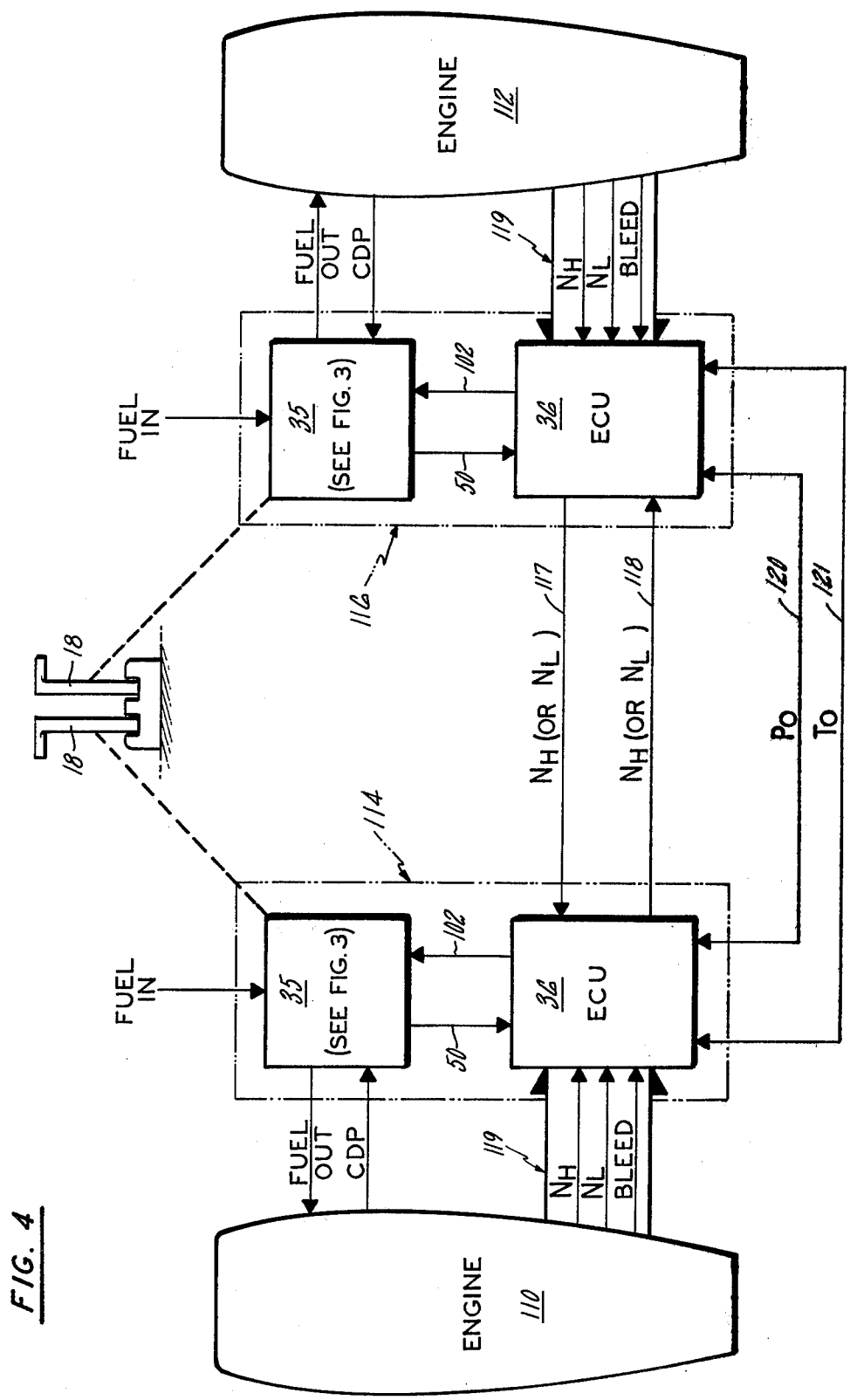
FIG. 4 is a schematic block diagram of a dual engine fuel control system embodying the present invention.

FIG. 4 illustrates a dual engine 110, 112 arrangement in which each engine uses a separate fuel control system 114, 116. Each system functions to control the fuel flow to its respective engine so as to avoid engine operation outside of dynamically determined maximum acceleration and deceleration limits and maximum engine speed limits, as shown in the functional block diagram in FIG. 9. These limits vary as a function of engine and ambient parameters.

The two fuel control systems 114, 116 operate independently of each other in controlling the fuel flow to their corresponding engines, except each one receives a speed manifesting $N_H$ (high pressure compressor fan speed) or $N_L$ (low pressure compressor fan speed) over a line 117, 118 from the other which is used for speed synchronizing the engines in the manner described later in this description. Each system includes a hydromechanical section 35 and an ECU 36 that receives signals manifesting $N_H$, $N_L$ and engine air bleed from its controlled engine over lines 119. Each ECU receives signals reflecting ambient temperature $T_O$ and pressure $P_O$ over lines 120, 121. In addition, each ECU receives a signal reflecting PLA over the line 50 from the hydromechanical portion 35. Each ECU 36 utilizes the aforementioned signals to produce a motor control signal on the line 102 to operate the torque motor 100 to modify fuel flow to the engine.

In accordance with the present invention the ECU controls the torque motor so as to regulate fuel flow to the engine in a manner which prevents engine operation outside dynamically computed acceleration and deceleration limits (determined by the ECU with respect to the instantaneous $N_H$, $N_L$, bleed, $P_O$ and $T_O$). In addition, the ECU regulates fuel flow with regard to those operating parameters so that when the power lever 18 is fully advanced, the fuel flow supplied to the engine will bring it to its maximum permissible speed for those parameters (See FIG. 7). Additionally, an engine speed synchronizing operation augments these operations: For example, if the engine 110 is operating at a higher speed than the engine 112, the ECU in the system 114 compares the speed of engine 112 (the "remote" engine) with the speed of engine 110 (the "local" engine) and modifies the signal over the line 102 to reduce the fuel flow to the engine 110 to bring it to a lower speed. Simultaneously, the fuel control system 116 operates in the opposite manner; however, the ECU therein receives the "remote" speed signal from the engine 110 and generates a signal over the line 102 therein, causing the fuel flow to increase. It is in this fashion, one engine speeds up and the other slows down, that the engines are speed synchronized—without movement of the power levers 18.

Figure 5:
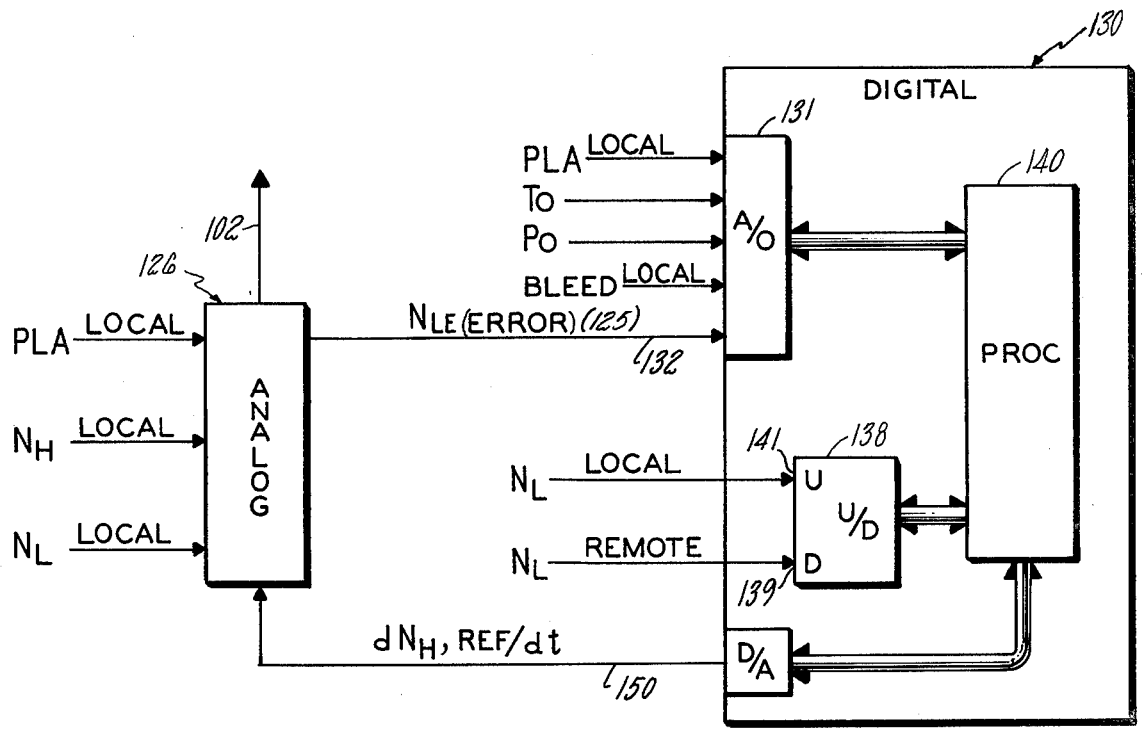
FIG. 5 is a schematic block diagram of the electronic computation unit (ECU) according to the present invention.
Figure 7:
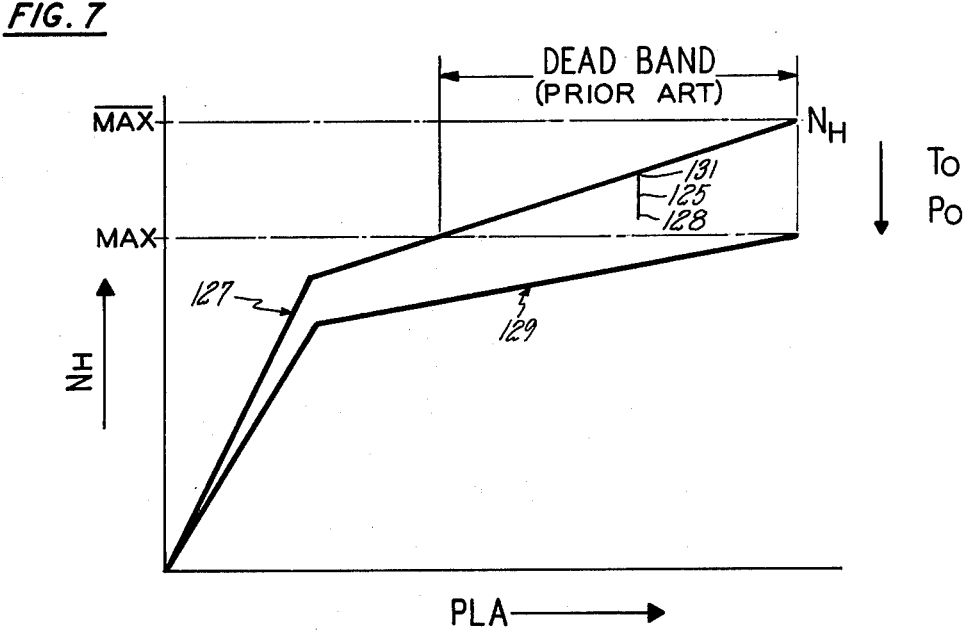
FIG. 7 is a graph illustrating the relationship between engine speed and power lever position.

As shown in FIG. 5, the ECU includes an analog unit 126 and a digital unit 130. $N_H$, $N_L$ and PLA for the local (controlled) engine are supplied to the analog section which computes from the base PLA-$N_L$ relationship (curve 127 in FIG. 7) a baseline error signal 125, $N_H$ ERROR manifesting the difference between actual engine speed 128 and scheduled speed 131 for the PLA. In FIG. 7 MAX represents the absolute maximum permissible engine speed, $N_L$ RED LINE; MAX represents a lower maximum speed due to either or both engine case temperature and pressure limits, which are functions of $P_O$ and $T_O$. The baseline error signal is supplied to a multiplexed A-D converter 131 over a line 132, along with an analog PLA, $T_O$ and $P_O$; and its output is transferred to a microprocessor 140 on command therefrom. The processor may be an Intel 8048, which uses an 8-bit word language, and its associated: ROM for program storage, RAM for dynamic data storage, a system clock and interupt selector, all these obviously defining an operative microprocessor based system according to established techniques. Other processors or computers obviously may be utilized in practicing the present invention. And although the invention achieves its greatest practical utility in a microprocessor based system, analog equivalent system, those providing the same computational functions, as described later herein, may be used.

The digital section 130 also includes an up/down counter 138 which receives the remote speed signals from the companion engine on its down count input 139 and the local speed signals from the directly controlled engine on its up count input 140 for speed synchronization. Speed synchronizing may be done by comparing the $N_H$ or $N_L$ of the engines; an $N_L$, $N_H$ selection circuit (not shown) may be used for that purpose.

As illustrated in FIG. 8, the speed signals $N_{H\,local}$, $N_{H\,remote}$ are pulses whose frequencies are directly proportional to engine speed. Hardware for this engine may include pulse generators (not shown) which are interfaced to the high and low pressure stages so as to be triggered in proportion to rotation speed. The counter 138 counts up upon receiving a local pulse 146 and counts down upon receiving remote pulse 147. When the engines are synchronized, at A, local speed equals remote speed, and produces a periodic one count 145 on the output of the up/down counter 138. However, if the local speed exceeds remote, at B, the up/down counter accumulates up counts at a rate which is proportional to the speed difference, until an $N_{H\,remote}$ pulse is received. The resulting higher count 148 manifests the difference in speed between the two engines. The up/down count from the counter 138 is supplied directly to the processor.

Figure 9:
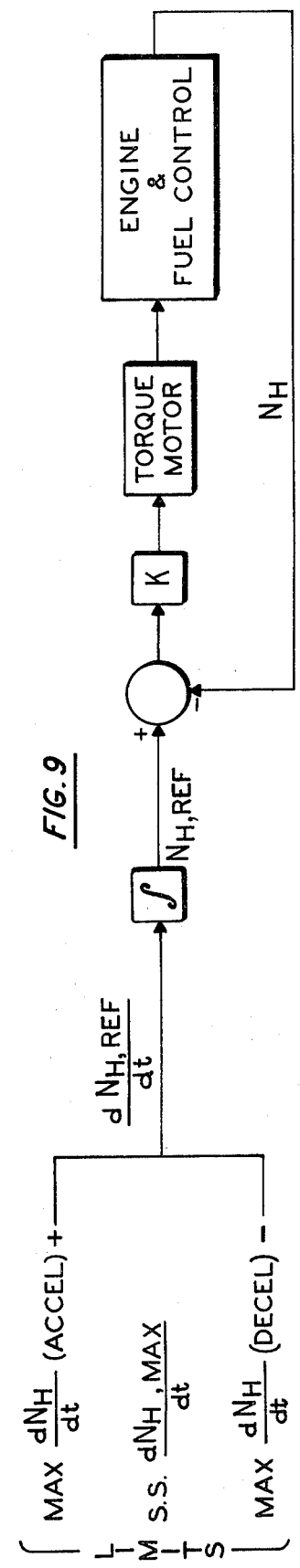
FIG. 9 is a simplified functional block diagram illustrating the closed loop fuel control system according to the present invention.

The processor utilizes the binary PLA, $T_O$, $P_O$ information 149 from the A/D converter 131 and the speed asynchronization signal from the up/down counter to compute a digital speed reference rate signal $dN_{H,\,REF}/dt$ which is converted from digital to analog form in a D/A converter 149 and supplied back to the analog section 126 over a line 150. The speed reference rate is integrated in the analog section to produce a speed reference $N_{H,\,REF}$ which is compared with $N_H$ for producing a motor control signal over the line 102 to the torque motor. FIG. 9 illustrates the closed loop engine control system thereby achieved.

The processor performs a selection process between several different limiting parameters; the most significant of which is supplied, as a $dN_{H,\,REF}/dt$ parameter, to the analog section for integration. The output from the digital section 130 is a rate of change in $N_H$, however, analog integration provides for multiplication by an infinitly resolvable time multiplier; therefore a lower order binary word for the rate of change in $N_{H,\,REF}$ generates a high resolution $N_{H,\,REF}$. Hence, by operating in the rate of change domain, so to speak, the invention permits the use of an inexpensive 8-bit processor in a fuel control system without sacrificing good resolution—low granularity. Furthermore, since the processor operates on a baseline error, rather than absolute engine speed, a lower level binary word can be used. Additionally, the computed limits have small ranges compared to the absolute engine speed, further facilitating use of a lower level binary system.

Figure 6:
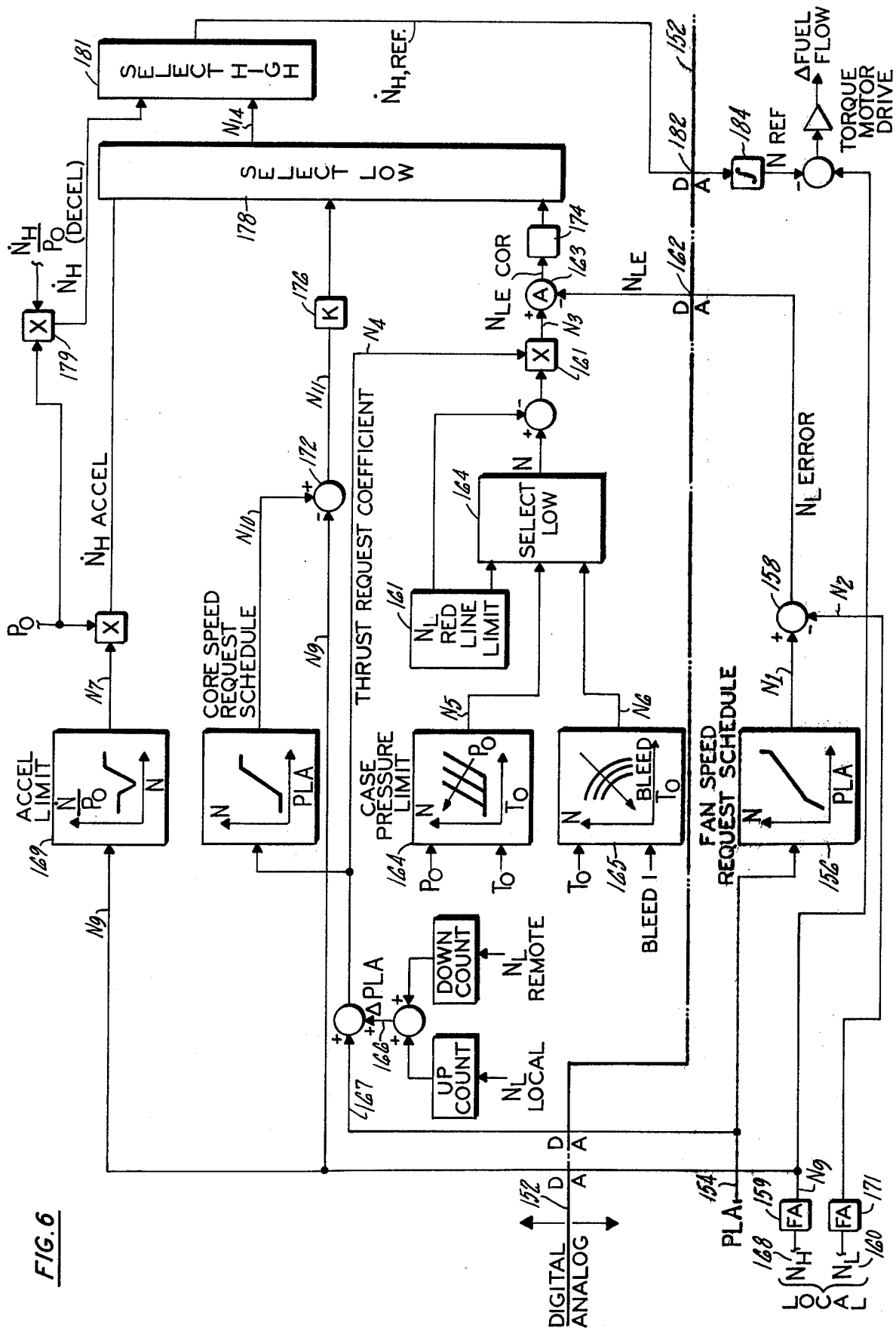
FIG. 6 is a functional block diagram of the ECU and illustrates the processes and functions employed therein in accordance with the present invention.

FIG. 6 illustrates the processes and functions performed by the analog and digital sections. In the following explanation using FIG. 6 parenthesis () appear around reference numerals that identify steps, processes or functions in FIG. 6. Conversion from analog to digital and digital to analog occurs across the line 152, which marks the separate analog and digital sections; in effect, the line represents the A/D and D/A conversion processes. The analog manifestation of PLA 154 is supplied to a function generator 156 which produces the scheduled fan speed or baseline speed $N_1$ (131 in FIG. 7). The pulses defining $N_L$, at 160, are applied to a frequency to analog (FA) converter 159 for conversion into a D.C. signal $N_2$ whose magnitude is proportional to the frequency of $N_L$. $N_1$ and $N_2$ are summed (158) yielding an $N_{L,\,ERROR}$ ($N_1 - N_2$) representing the difference (130 in FIG. 7) between scheduled and actual speed. $N_{L,\,ERROR}$ is converted (162) into digital and supplied to the microprocessor. The microprocessor sums (163) it with a negative correction number $N_3$ generated by multiplying (161) a thrust coefficient $N_4$, representing the percentage of full power requested, and the difference between a stored absolute maximum permissible engine speed $N_{L,\ RED\ LINE}$ and the selected 164 lowest of: a permissible maximum speed $N_5$ computed 164 with respect to pressure limits from $T_O$ and $P_O$; a maximum speed $N_6$ computed 165 with respect to a thermal limit from $T_O$ and engine bleed; or $N_{L,\ RED\ LINE}$. The general relationship between $P_O$, $T_O$ and bleed, for computing the limits $N_5$, $N_6$, are as indicated by the graphical depictions contained in the steps (164), (165) and they are widely known and understood.

The output 166 from the up/down counter modifies the thrust coefficient $N_4$ to synchronize the engines by summing the digital manifestation of PLA 167 with the up/down counter output 166.

$N_H$ is converted by a converted 171 to an analog signal $N_9$ whose magnitude is proportional to the frequency of $N_H$. An acceleration limit $N_7$ is computed (169) from $N_9$ and is multiplied (170) by $P_O$ to produce a maximum permissible acceleration $N_{H,\ ACCEL}$ ($dN_H/dt$). From $N_4$ an $N_H$ speed request $N_{10}$ is computed (170); $N_{10}$ is used as a limit during engine start, as will be explained later herein. $N_{10}$ is summed (172) with $N_9$ and subtracted from $N_{10}$, producing an error $N_{11}$ which manifests the $N_H$ speed error during start. $N_{L,\ ERROR}$ is summed (163) with $N_3$ to produce $N_{LE,\ CORR}$, a "corrected" $N_{L,\ ERROR}$. The select low step (164) produces an $N_{LE,\ CORR}$ which is less than or equal to zero. If the engine can operate up to $N_{L,\ REDLINE}$, there is no need to augment normal fuel control to engine speed and $N_3$ is zero. In most cases, however, the limits from steps (164) and (165) will yield engine speed limit less than $N_{L,\ RED\ LINE}$, thus producing a negative $N_3$ which yields an $N_{LE,\ CORR}$ which is smaller than $N_{L,\ ERROR}$.

$N_{LE,\ CORR}$ and $N_{11}$ are scaled (174), (175) so that they will produce the proper $N_{H,\ REF}$ for desired control loop performance. As explained later herein, $N_{11}$ and $N_{LE,\ CORR}$ are converted into utilizable "rate" parameters. Of $N_{H,\ ACCEL}$, $N_{LE,\ CORR}$ and $N_{11}$ the one producing the lowest $N_{H,\ REF}$ (when integrated) is selected (178) as the limit $N_{14}$.

$P_O$ is multiplied (179) with a fixed deceleration factor at 180 to produce a maximum permissible deceleration rate $N_{H,\ DECEL}$. The higher of $N_{H,\ DECEL}$ and $N_{14}$ is selected (181) and then is converted from digital into analog (182) and integrated (184) (in a discrete integrator) in the analog section to produce an $N_{H,\ REF}$ which is summed (i.e. a summing amplifier) with $N_H$. The sum of the two controls the operation of the torque motor to modify ratio units, as shown in FIG. 9, so as to bring the engine speed to $N_{H,\ REF}$. Generally speaking, the modification is diminution in the basic ratio units scheduled by the hydromechanical portion.

Through the select low and select high sequence, the most significant engine operating constraint is used to generate $N_{H,\ REF}$. Through the select high and select low steps, therefore, $N_{H,\ REF}$ has a range which reflects (through differentiation): a lower limit manifesting the maximum acceptable decel rate and upper limit manifesting the maximum acceptable acceleration rate, and in between the two limits a desired engine speed for the particular power setting. The consequence of the foregoing process is to compute the maximum permissible speed at any operating condition during steady state, which results in shifting the fan speed request schedule downward to yield the schedule shown in FIG. 7 by curve 184. $P_O$, $T_O$ and engine bleed obviously shift the maximum speed downward, which in contemporary systems produces the dead band region 186 for PLA. However, according to the system embodying the present invention, more specifically the process described in FIG. 6, the curve is shifted downward (curve 129), and the maximum permissible engine speed occurs at maximum PLA; hence, there is no dead band.

The recomputation of scheduled engine speed $N_1$ is illustrated by the following. At an engine steady state speed $N_L$, $N_{LE,\ CORR}$ is zero ($N_{LE}=N_3$); and $N_{LE}+(N-N_{L,\ RED\ LINE})\cdot$thrust coefficient $[N_4]=0$;
$N_{LE}=N_1-N_L$; therefore:
$N_L=N_1+(N-N_{L,\ RED\ LINE})\cdot N_4$
$N_1=N_{L,\ RED\ LINE}\cdot N_4$; therefore
$N_L=N_{L,\ RED\ LINE}\cdot N_4+(N_1-N_{L,\ RED\ LINE})\cdot N_4$, thus;
$N_L=N\cdot N_4$.
$N=$ the computed maximum engine speed limit at fuel power (MAX PLA); therefore:
$N_4=PLA/MAX$; therefore
$N_L/PLA=N/MAX$ PLA.

By plotting the relationship thus provided between $N_L$ and $N$ for each $N_L$, a new scheduled speed curve 129 is produced providing the same functional control between PLA and engine speed except that the maximum engine speed is lower (MAX in FIG. 7) and is provided at maximum PLA (MAX PLA). Consequently, a dead band does not appear, which is unlike prior art fuel controls attempting to provide the same speed control functions.

As mentioned previously, at low power settings, principally during start-up, $N_H$ governing (through the core speed request schedule) produces the most limiting parameter selected through the select step 178 and the select high step 181. This provides speed control from the high speed fan which is more reliable during start-up engine than the low speed fan that typically is "sluggish" during start-up. The core speed request schedule is set up so that at low PLA $N_{14}$ is greater than $N_{H,\ DECEL}$, yet smaller than $N_{H,\ ACCEL}$ and $N_{LE,\ CORR}$.

The foregoing explanation and description of the preferred embodiment obviously demonstrates the suitability of a microprocessor for carrying out the computational steps for generating and selecting the limits. That notwithstanding, it will be equally obvious that the same functions may be performed to an analog hard wired system or a hybrid system employing a computer, such as a microprocessor, and selected hard wired components. It follows, as well, that digitalization of the analog section is an available alternative to the discreet embodiment described herein, albeit at a greater cost and with some sacrifice in resolution.

The foregoing is a detailed description of the preferred embodiment of the present invention; nevertheless to one skilled in the art it will suggest modifications and variations thereto and therein, in addition to those already mentioned, without departing from the true scope and spirit of the invention hereinafter claimed.

I claim:

1. A fuel control system for gas turbine engines, comprising:
   a hydromechanical fuel section for providing fuel flow to the engine at commanded power settings and including means for augmenting said fuel flow in response to a fuel flow modifying signal, and signal processing means for providing said fuel flow modifying signal in response to signals applied thereto, said signals reflecting power setting, engine speed and ambient and engine conditions, characterized in that said processing means comprises means for providing a correction signal which is summed with an engine speed signal, said correction signal being selected from a plurality of signals each reflecting a maximum engine speed, at least one of said signals being related to the power setting, engine speed and any difference between engine speed and a scheduled engine speed for the particular power setting in such a way as to reflect the required change, if any, in engine speed in order to produce, between actual engine speed and maximum engine speed, a ratio which is the same as the ratio between the actual power setting and the maximum power setting.

2. A fuel control according to claim 1, characterized in that said processing means comprises means for providing a signal which reflects an adjusted engine speed, the ratio of said adjusted engine speed to the minimum maximum engine speed being the same as the ratio between the actual power setting and the maximum possible power setting.

3. A fuel control system according to claim 1, characterized in that said processing means comprises means for providing a signal reflecting the difference between said adjusted engine speed and the difference between the actual engine speed and a scheduled engine speed for the actual power setting.

4. A fuel control system according to claim 1, characterized in that said signal processing means comprises means for providing a signal which reflects the difference between a maximum engine speed and a selected lower maximum engine speed.

5. A fuel control system according to claim 1, characterized in that said processing means comprises an analog section for providing an analog error signal reflecting the difference, if any, between actual engine speed and a scheduled speed which is a function of the power setting, a digital section responsive to a digital equivalent of said analog error signal for providing a digital speed correction signal, said analog section being responsive to an analog equivalent of said digital speed correction signal and a signal reflecting actual engine speed for providing a signal reflecting the difference between the actual engine speed and the speed reflected by said analog engine speed signal.

6. A fuel control system comprising:

a hydromechanical fuel section for providing fuel flow to the engine at commanded power settings and including means for augmenting said fuel flow in response to a fuel flow modifying signal, and signal processing means for providing said fuel flow modifying signal in response to signals applied thereto, said signals reflecting power setting, engine speed and ambient and engine conditions, characterized in that said processing means comprises means for providing a correction signal which is summed with an engine speed signal, said correction signal being selected from a plurality of signals each reflecting a maximum engine speed, at least one of said signals being related to the power setting, engine speed and any difference between engine speed and a scheduled engine speed for the particular power setting in such a way as to reflect the required change, if any, in engine speed in order to produce between actual engine speed and maximum engine speed a ratio which is the same as the ratio between the actual power setting and the maximum power setting, and in that said signal processing means further comprises means responsive to an engine operating speed signal and a speed signal of a second remote engine for providing a signal for modifying said speed correction in relation to an asynchronization parameter having a magnitude manifesting a difference, if any, in speed between the two engines.

7. A fuel control system according to claim 6, characterized in that said signal processing means includes means for providing a signal which reflects the difference in the speeds of the engines, said means being responsive to engine speed signals comprising successive pulses whose repetition rate reflects engine speed.

* * * * *

UNITED STATES PATENT AND TRADEMARK OFFICE
CERTIFICATE OF CORRECTION

PATENT NO. : 4,296,601
DATED : October 27, 1981
INVENTOR(S) : Anthony N. Martin

It is certified that error appears in the above—identified patent and that said Letters Patent is hereby corrected as shown below:

"Assignee: Otis Elevator Company, Hartford, Conn." should read --Assignee: United Technologies Corporation, Hartford, Conn.--

Column 9, line 41, "MAX" should read --$\overline{MAX}$--

Column 11, line 21, "$N_H$" should read --$\dot{N}_H$--

Column 11, line 41, "$N_H$" should read --$\dot{N}_H$--

Column 12, line 41, "$N_H$" should read --$\dot{N}_H$--

Column 12, line 42, "$N_H$" should read --$\dot{N}_H$--

Signed and Sealed this

Twelfth Day of January 1982

[SEAL]

Attest:

Attesting Officer

GERALD J. MOSSINGHOFF
Commissioner of Patents and Trademarks